United States Patent

Miller

[15] 3,701,978

[45] Oct. 31, 1972

[54] STORAGE AND CONVERTER SYSTEM

[72] Inventor: Herbert Edward Miller, Brookline, Mass.

[73] Assignee: Epsco Incorporated, Westwood, Mass.

[22] Filed: Oct. 23, 1970

[21] Appl. No.: 83,585

Related U.S. Application Data

[62] Division of Ser. No. 785,284, Dec. 19, 1968, Pat. No. 3,585,308.

[52] U.S. Cl...........................340/173 R, 340/173 RC

[51] Int. Cl............................................G11c 21/00

[58] Field of Search......340/173 RC, 173 R, 347 SH; 333/29; 179/15 A, 15 AP, 15.55 R

[56] References Cited

UNITED STATES PATENTS 3,471,644 10/1969 Gold et al.............179/15 AP 3,629,509 12/1971 Glaser......................179/15 A

*Primary Examiner*—James W. Moffitt

*Attorney*—Joseph Weingarten

[57] ABSTRACT

A multiplex converter system for continuously, selectively updating information in a plurality of analog output channels by means of a single input channel by converting an input signal from the input channel to a first analog signal and storing it in a particular one of the channels to provide a second analog signal output from that channel which is a replica of the first analog signal, while the other channels are similarly updated by other input signals supplied by the input channel.

8 Claims, 1 Drawing Figure

PATENTED OCT 31 1972 3,701,978
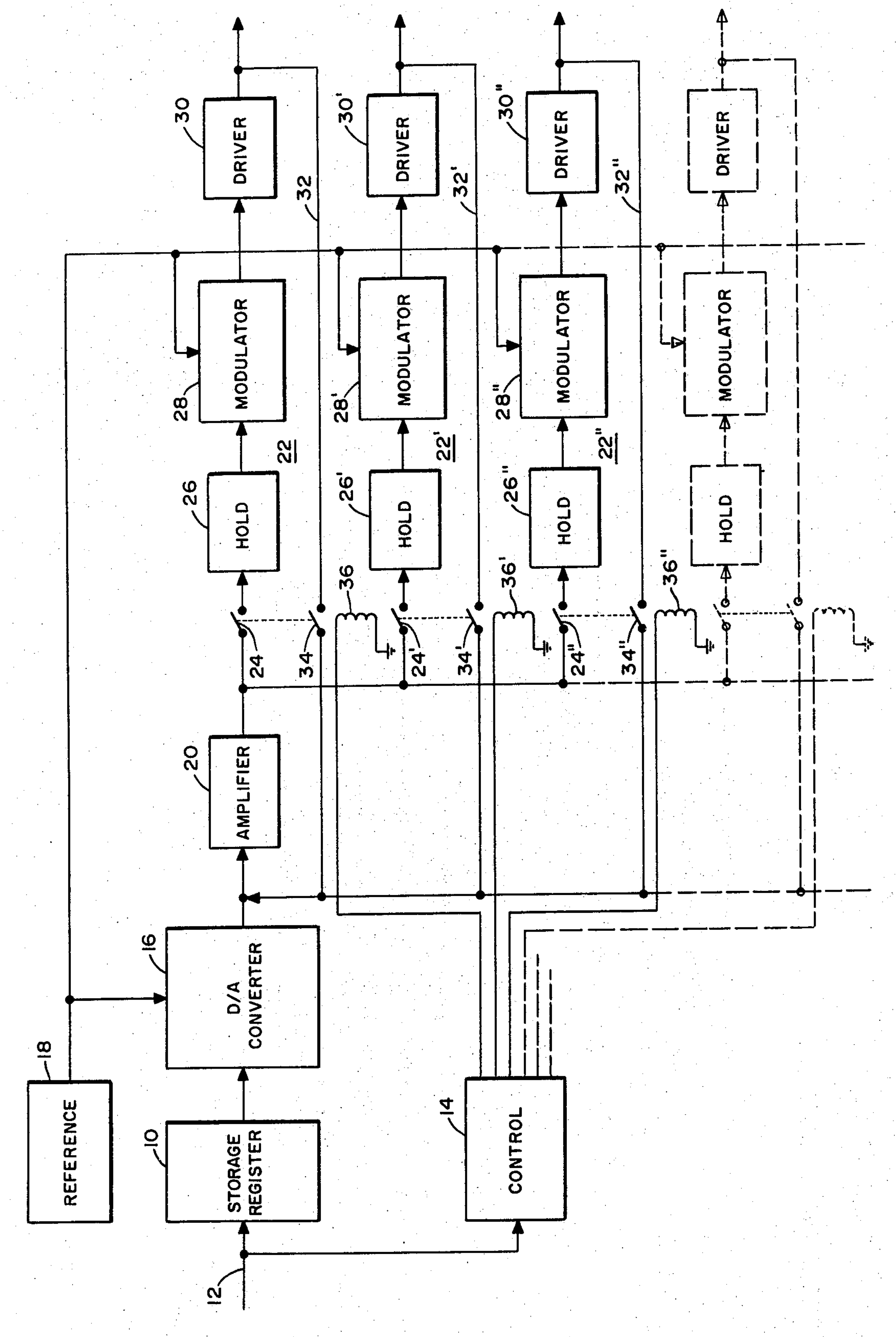

STORAGE AND CONVERTER SYSTEM

This is a division of application Ser. No. 785,284, filed Dec. 19, 1968 and now U.S. Pat. No. 3,585,308.

BACKGROUND OF INVENTION

This invention relates to an analog storage system, and more particularly to a multiplex converter system for continuously selectively updating information in a plurality of analog output channels by means of a single input channel.

In certain installations the digital output from a computer is used as input to continuously selectively update the information in a plurality of analog output channels. Generally, each such analog output channel has at its input end a digital storage register and a digital to analog converter for receiving the digital output of the computer. Each word or group of digital information from the computer may carry with it an address identifying the channel or storage register in which it is to be stored. While that digital information is stored in the register, an analog signal derived from it is being generated by the digital to analog converter in that particular channel. The computer is continuously putting out new groups of digital information addressed to various ones of the registers and channels. Each channel may keep delivering an analog signal derived from the digital information stored in its register until new digital information addressed to that channel replaces the existing information.

SUMMARY OF INVENTION

It is therefore a primary object of this invention to provide an analog storage system.

It is a further object of this invention to provide a multiplex converter system for selectively updating information in a plurality of analog output channels by means of a single input channel.

It is a further object of this invention to provide such a converter system which is simple and inexpensive and which may be operated with one storage register and one converter.

The invention may be accomplished by an analog storage system including a reference signal source and converter means for receiving an input signal in a first form and combining it with the reference signal from the reference signal source to provide a first analog signal. Sampling means are used to sample a first analog signal and storage means store the sample which is then combined with the reference signal in a modulator means to produce a second analog signal which is a replica of the first analog signal.

In preferred embodiments the converter means output is selectively connected to a plurality of analog output channels, each such channel including sampling means, storage means and modulator means, to continuously update information in those channels with information supplied by a single input channel.

DISCLOSURE OF PREFERRED EMBODIMENT

Other objects, features and advantages will occur from the following description of a preferred embodiment and the accompanying drawing, in which is shown a schematic block diagram of a portion of a multiplex digital to analog converter system according to this invention.

The invention may be embodied in a multiplex digital to analog converter system in which a digital signal is delivered from a computer to a storage register which then submits that digital signal to a digital to analog converter. In that digital to analog converter the digital signal is combined with a reference signal from a reference signal source to provide an input analog signal. That input analog signal may be amplified and presented to a sampling device at the input of each of a plurality of analog output channels. A control circuit, which may include an address register and decoder device, receives the address portion of the digital signal and in response thereto directs one of the sampling devices to sample the input analog signal.

The sample thus made is stored in a holding circuit which provides that sample to a modulator which combines that sample with the reference signal to produce an output analog signal which is a replica of the input analog signal. A driver amplifier may be provided at the output of the modulator and a loop may be established to feed back the output analog signal to the input of the amplifier. If such a loop is used, switch means, actuatable with the sampling means, may be included in it.

Immediately after the sample is made, the sampling device, and switch means in the feedback loop, may be opened to dissociate that channel from the input digital signals, storage register, digital to analog converter and amplifier. Once this is done those elements may function again with a new input digital signal from the computer to provide another input analog signal to be sampled for updating another channel identified by the address accompanying the new input digital signal, while the previously updated channel continues to provide that output analog signal which is a replica of the input analog signal derived from the previous input digital signal. In this manner a particular channel continues to provide an output analog signal derived from an updating input digital signal, while other input digital signals are being converted to input analog signals to update other channels.

Such a multiplex converter system is shown in the drawing where storage register 10 receives a digital signal on line 12 from an associated computer, which signal may consist of a 10 bit data word and three bit address. The 10 bit data word is stored in register 10 and the three bit address is stored and decoded in control unit 14. As soon as the word is placed in register 10, it is presented to digital to analog converter 16, where it is converted from a ten bit word in digital form to an analog signal by combination with a reference signal from reference signal source 18. Source 18 may provide various types of reference signals; in this embodiment the reference signal is preferably an alternating current signal. After passing through amplifier 20 the analog signal produced by converter 16 becomes the input signal to one of the analog channels 22, 22′, 22″ . . . Each such channel includes a sampling device such as sampling switch 24, 24′, 24″ . . . a hold circuit 26, 26′, 26″ . . . a modulator 28, 28′, 28″ . . . and a driver amplifier 30, +′, 30″ . . . the output from driver amplifier 30 may be fed back through line 32, 32′, 32″ . . . to the input of amplifier 20 to provide a feedback loop. A switch 34, 34′, 34″ . . . actuatable with sampling switch 24 may be included in line 32 to complete isolation of the channel when the sampling switch is open. Sampling switch 24 and feedback switch 34 are mechanically coupled and actuated by a relay 36, 36', 36'' . . . driven by a signal from control 14.

Any number of similar channels may be combined in such an assembly: the number of channels shown in the drawing is not a limitation on this application of the invention. The address portion must be large enough to accommodate the number of channels. For example, in this embodiment the three bit binary address is capable of identifying a maximum of eight channels. Each additional bit in the address portion doubles its capacity, i.e., four bits, sixteen channels; five bits, thirty-two channels, etc.

In operation when an updating data word appears on line 12 it is immediately stored in register 10 and presented to converter 16. The ten bit word is combined in converter 16 with the reference signal from signal source 18 and the resulting analog signal is passed through amplifier 20 and appears as an analog input signal for updating one of the channels 22, 22', 22'' . . . Simultaneous with the storage of the data word in register 10, the three bit address portion accompanying the data word is presented to control 14 where it is stored and decoded. When decoded the three bit address provides a signal to one of relays 36, 36', 36'' . . . to close the associated sample and feedback switches. For example, when relay 36 is energized switches 24 and 34 are closed causing channel 22 to sample the input analog signal from amplifier 20. The sample is then stored in hold circuit 26 which maintains the sample level so that it may be combined with the reference signal from reference signal source 18 to provide an output analog signal which passes through driver amplifier 30 to other associated equipment.

Immediately after the sample is made by closing switches 24 and 34 those switches are opened, so that a new updating data word carrying a new address portion may be converted to a new input analog signal to be sampled by whichever channel is designated by the address by means of control 14. However, the output analog signal derived from the sample stored in hold circuit 26 continues even after the switches 24 and 34 have been reopened, and will continue until a new data word appears bearing a new address portion designating channel 22 as the channel to be updated.

Each of the channels operates in this manner, so that a plurality of channels provide current analog information which is periodically updated by means of a single digital input channel and digital to analog converter, thereby eliminating the need for a multiplicity of rather complex storage registers and digital to analog converters and requiring only relatively simple and inexpensive sample, hold, and modulator circuits. The analog storage facility provided by this invention may be embodied in apparatus other than a multiplex converter system as shown herein.

Other embodiments will occur to those skilled in the art and are withing the following claims:

What is claimed is:

1. An analog signal storage system comprising
   a reference signal source;
   converter means for receiving an input signal in a first form and combining it with the reference signal from said reference signal source to provide a first analog signal;
   sampling means for sampling said first analog signal;
   storage means for storing a sample of said first analog signal; and
   modulator means for combining said sample and said reference signal to produce a second analog signal which is a replica of said first analog signal.

2. The system of claim 1 further including an input amplifier connected between said converter means and said sampling means.

3. The system of claim 1 in which said sampling means includes first switching means.

4. The system of claim 1 in which said reference signal source provides an alternating current signal.

5. The system of claim 1 in which said converter means includes a digital to analog converter.

6. The system of claim 1 further including a feedback loop connected between the output of said modulator means and the input of said sampling means.

7. The system of claim 6 further including a driver amplifier responsive to the output of said modulator means.

8. The system of claim 6 further including second switching means in said feedback loop actuatable with said sampling means.

* * * * *